United States Patent [19]

Kuwabara et al.

[11] 4,287,487
[45] Sep. 1, 1981

[54] GAS LASER GENERATING DEVICE OF THE LONGITUDINAL GAS FLOW TYPE

[75] Inventors: Kouji Kuwabara; Hiroyuki Sugawara, both of Hitachi; Toshiharu Shirakura, Tokaimura; Kouji Sasaki; Satoshi Takemori, both of Hitachi, all of Japan

[73] Assignee: Hitachi, Ltd., Tokyo, Japan

[21] Appl. No.: 52,195

[22] Filed: Jun. 26, 1979

[30] Foreign Application Priority Data

Jun. 28, 1978 [JP] Japan ................................ 53/77488

[51] Int. Cl.³ ............................................. H01S 3/03
[52] U.S. Cl. ............................ 331/94.5 G; 331/94.5 C
[58] Field of Search ................... 331/94.5 G, 94.5 PE, 331/94.5 C, 94.5 D

[56] References Cited

U.S. PATENT DOCUMENTS

| | | | |
|---|---|---|---|
| 3,772,610 | 11/1973 | Foster et al. | 331/94.5 G |
| 3,777,279 | 12/1973 | Eckbreth et al. | 331/94.5 PE |
| 4,044,281 | 8/1977 | Washburn | 331/94.5 PE |

OTHER PUBLICATIONS

"CW $CO_2$ Laser at Atmospheric Pressure", by McLeary et al., *Jour. Quant. Elect.* IEEE vol. QE 9, No. 8, (Aug. 1973).

*Primary Examiner*—William L. Sikes
*Assistant Examiner*—Léon Scott, Jr.
*Attorney, Agent, or Firm*—Craig and Antonelli

[57] ABSTRACT

A gas laser generating device of the longitudinal gas flow type having at least two glow discharge tubes, each of which has positive and negative electrodes, electric insulating tubes which are inserted between the two glow discharge tubes in order to provide insulation therebetween, and mirrors which are positioned at the ends of the two glow discharge tubes. In the glow discharge tubes, gas is excited to generate gas lasing and this gas lasing is amplified by the reflections of the mirros. Also, there are further provided triggering electrodes near either the negative or positive electrodes of the glow discharge tubes, respectively, which triggering electrodes are connected to the positive electrodes through triggering resistors, respectively.

6 Claims, 1 Drawing Figure

GAS LASER GENERATING DEVICE OF THE LONGITUDINAL GAS FLOW TYPE

BACKGROUND OF THE INVENTION

This invention relates to a gas laser generating device of the longitudinal gas flow type having two glow discharge tubes which are arranged left and right on the same axis, each of which has positive and negative electrodes and is filled with circulating gas such as carbon dioxide ($CO_2$), nitrogen ($N_2$), helium ($H_e$), etc.

When the electrodes of each tube are applied with a d.c. voltage from a common electric power source, the glow discharge tubes begin to discharge so that the gas is excited into population inversion and generate a laser.

The lasing is amplified by reflecting the light between two mirrors which are positioned on the left and right ends of the two glow discharge tubes, after which the light exits through one of the two reflecting mirrors.

Such gas laser generating devices of the longitudinal gas flow type are usually used in order to cut or drill steel plates or similar articles because such gas laser generating devices are capable of generating relatively large output power. However, the conventional gas laser generating device as described above has certain defects.

For example, the two glow discharge tubes start to discharge, the discharge starting times of the tubes are different from each other. Therefore, electrical insulating tubes provided between the left and the right glow discharge tubes are disadvantageously applied with a large voltage of the d.c. power source because the electrodes of the two glow discharge tubes are connected to the same electric power source. For this reason, the electrical insulating tubes of a conventional gas laser generating device have to be relatively large and this undesirably increases the size of the whole laser device.

SUMMARY OF THE INVENTION

An object of the present invention is to provide an improved gas laser generating device of the longitudinal gas flow type.

Another object of the present invention is to reduce the longitudinal length of the electric insulating tubes which insulate the glow discharge tubes from a metal tube which is usually at ground potential.

These objects of the present invention mentioned above are achieved by adding a third electrode to the each of the glow discharge tubes, which electrode is connected to one of the positive and negative electrodes through a resistor.

BRIEF DESCRIPTION OF THE PREFERRED EMBODIMENT

FIG. 1 shows an embodiment of a gas laser generating device of the longitudinal gas flow type in accordance with the present invention.

DETAILED DESCRIPTION OF THE PREFERRED EMBODIMENT

Figure 1:
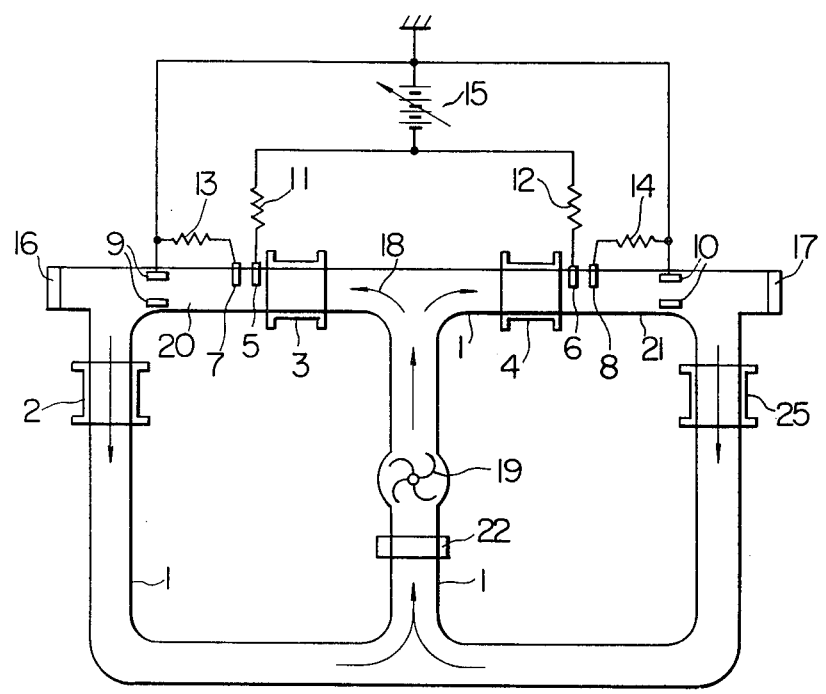

In FIG. 1, reference numeral 1 designates a metal tube, in which flows a gas 18, such as carbon dioxide ($CO_2$), nitrogen ($N_2$), helium ($H_e$), etc. Reference numerals 2, 3, 4 and 25 designate electrical insulating tubes which electrically insulate gas discharge tubes 20 and 21 from the metal tube 1 which is usually at ground potential. A blower 19 circulates the gas 18 filled in the metal tube 1, the electrical insulating tube 2, 3, 4 and 25 and the gas discharge tubes 20 and 21, as indicated with arrows. The circulating gas is cooled with a cooler 22 so that the population inversions of the molecules of the gas 18 are kept at an appropriate level.

The gas discharge tubes 20 and 21 have positive electrodes 9 and 10, negative electrodes 5 and 6 and trigger electrodes 7 and 8, respectively. The negative electrodes 5 and 6 are connected to a negative terminal of a d.c. power supply 15 through trigger resistors 13 and 14, respectively. The positive electrodes 9 and 10 are connected to the positive terminal of the d.c. power supply 15. Reference numerals 16 and 17 designate mirrors which reflect the laser.

When the voltage of the d.c. power supply 15 increases, glow discharge begins first between the trigger electrode 7 and the negative electrode 5 and between the trigger 8 and the negative electrode 6, before the main discharge begins between the positive electrode 9 and the negative electrode 5 and between the positive electrode 10 and the negative electrode 6. For example, at the time when the main glow discharge begins between the positive 10 and the negative electrode 6, the glow discharge has already begun between the trigger electrodes 7 and the negative electrode 5. Therefore, the voltage between the negative electrodes 5 and 6 is not large.

In a case trigger electrodes 7 and 8 are not provided, the voltage between the negative electrodes 5 and 6 becomes very large. The reason for this is that because both of the main glow discharges do not begin at a same time, the voltage of the negative electrode which begins to discharge earlier becomes higher than that of the other negative electrode by the voltage of the d.c. power supply 15. The electric insulating tubes 3 and 4 must endure the large voltage between the negative electrodes 5 and 6. Therefore, the longitudinal lengths of the electric insulating tubes 3 and 4 must be large enough to endure such high voltage.

According to the present invention, the gas discharge tubes 20 and 21 have auxiliary electrodes, i.e. the triggering electrodes 7 and 8, which are connected to the positive electrodes 9 and 10 through the trigger resistors 13 and 14 respectively.

The resistance value R of the triggering resistors 13 and 14 is much larger than that of the ballast resistors 11 and 12. Therefore, the voltages of the negative electrodes 5 and 6 become smaller, only at the same time, the differential voltage between the negative electrodes also becomes smaller.

Moreover, because a part of the electrons discharged from the negative electrode reaches the positive electrode, the main glow discharge between the positive and negative electrodes starts easily. Compared to the conventional gas laser generating device without the triggering electrodes, the main glow discharge begins earlier. Therefore, the period during which the high voltage is applied between the negative electrodes 5 and 6 becomes very small, substantially equal to zero in practical use.

For these reasons, the longitudinal lengths of the electric insulating tubes 3 and 4 which are provided for insulating the negative electrodes 5 and 6 from each other, as well as for insulating these negative electrodes from the metal tube 1, are considerably lessened. Also, the longitudinal lengths of the electric insulating tubes 2 and 25 which are provided for insulating the positive electrodes 9 and 10 as well as for insulating these positive electrodes from the metal tube 1, also are considerably lessened.

In the embodiment of this invention, it should be noted that the triggering electrodes 7 and 8 are located at the lower positions of the negative electrodes 5 and 6 in the flow of the circulating gas 18, because the electrons can easily reach the positive electrodes 9 and 10. However, the positions of the negative electrodes and the triggering electrodes are not so limited.

The number of the gas discharge tubes, in the embodiment shown in FIG. 1, is two and the gas discharge tubes are arranged left and right on the same axis. However, it should also be noted that the present invention can be applied to gas laser generating devices of another type, in which more discharge tubes are provided and are arranged in parallel.

What is claimed is:

1. A gas laser generating device of the longitudinal gas flow type having at least two glow discharge tubes, each of which has positive and negative electrodes and two ends wherein said discharge tubes are located so that an end of one of said discharge tubes is adjacent an end of said other discharge tube, at least one electric insulating tube which is inserted between said adjacent ends of the two glow discharge tubes in order to insulate therebetween, mirrors which are positioned at at least one end of each glow discharge tube to form a resonant cavity, means for circulating a gas capable of lasing through said discharge tubes, and means for extracting laser energy from said device, wherein the flow of gas is excited to generate gas lasing which is amplified by reflection by said mirrors, and characterized in that there are further provided triggering electrodes located in close proximity with either the positive or the negative electrodes of each of said two glow discharge tubes, respectively, which triggering electrodes are connected to the other of said positive or negative electrodes of said two glow discharge tubes which they are not in close proximity with through triggering resistors, respectively.

2. A gas laser generating device of the longitudinal gas flow type according to claim 1, wherein the gas within said glow discharge tube flows in a direction from a negative electrode to a positive electrode in each of said discharge tubes, and said triggering electrode in each discharge tube is located downstream of the gas flow with respect to said negative electrode.

3. A gas laser generating device of the longitudinal gas flow type according to claim 1, wherein two electric insulating tubes are provided between the glow discharge tubes.

4. A gas laser generating device of the longitudinal gas flow type according to claim 1, wherein said two glow discharge tubes are aligned on a common axis.

5. A gas laser generating device of the longitudinal gas flow type according to claim 4, wherein there is further provided a metal tube coupled to both ends of each glow discharge tube, which metal tube includes a blower for circulating the gas within said glow discharge tubes, and wherein electric insulating tubes are provided at both ends of each of said glow discharge tubes for electrically insulating therebetween.

6. A device according to claim 1, wherein the electrodes which are in close proximity with the triggering electrodes are located nearer to the insulating tube than the other electrodes which are not in close proximity with the triggering electrodes.

* * * * *